United States Patent

[11] 3,542,121

[72] Inventor Niilo H. Kaartinen
    Turku, Finland
[21] Appl. No. 729,047
[22] Filed May 14, 1968
[45] Patented Nov. 24, 1970
[73] Assignee Packard Instrument Company, Inc.
    Downers Grove, Illinois
    a corporation of Delaware
[32] Priority March 25, 1968, May 16, 1967
[33] Finland
[31] 1390/67 and 829/68

[54] HEAT EXCHANGING METHOD FOR FLUID MATERIAL CONTAINING CONDENSIBLE VAPOR
8 Claims, 1 Drawing Fig.

[52] U.S. Cl. ............................................. 165/1,
    165/111, 165/142; 62/513
[51] Int. Cl. ............................................. F28b 3/00
[50] Field of Search ................................. 165/1, 2,
    111, 71, 154, 155.1, 156, 141, 142; 62/513

[56] References Cited
UNITED STATES PATENTS
2,477,772  8/1949  Simpson ........................ 165/71
3,043,119  7/1962  Sarukhanian ................. 62/513
3,381,746  5/1968  Wiegmann et al. ......... 165/71

Primary Examiner—Charles Sukalo
Attorney—Wolfe, Hubbard, Leydig, Voit and Osann

ABSTRACT: Method and apparatus for the processing of fluid materials, particularly in the preparation of samples for radioactive isotope tracer studies by combustion of starting materials containing such isotope tracers. The sample is burned in a combustion chamber and the combustion products are continuously exhausted from the combustion chamber and passed through a heat exchanger which condenses the condensable vapors in the combustion products. The condensed vapors are then separated from the gases, and the gases are passed into a reaction column if there is a radioactive isotope tracer remaining in gas form. Oxygen is fed into the combustion chamber at a controlled rate during combustion, and after combustion nitrogen gas is fed into the combustion chamber and exhausted therefrom through the heat exchanger and into the separating means, so as to purge the system of any remaining gaseous production products. A liquid scintillator, and a liquid solvent if desired, are passed through the heat exchanger into the separating means after each combustion so as to recover any residual condensed vapors.

Patented Nov. 24, 1970
3,542,121
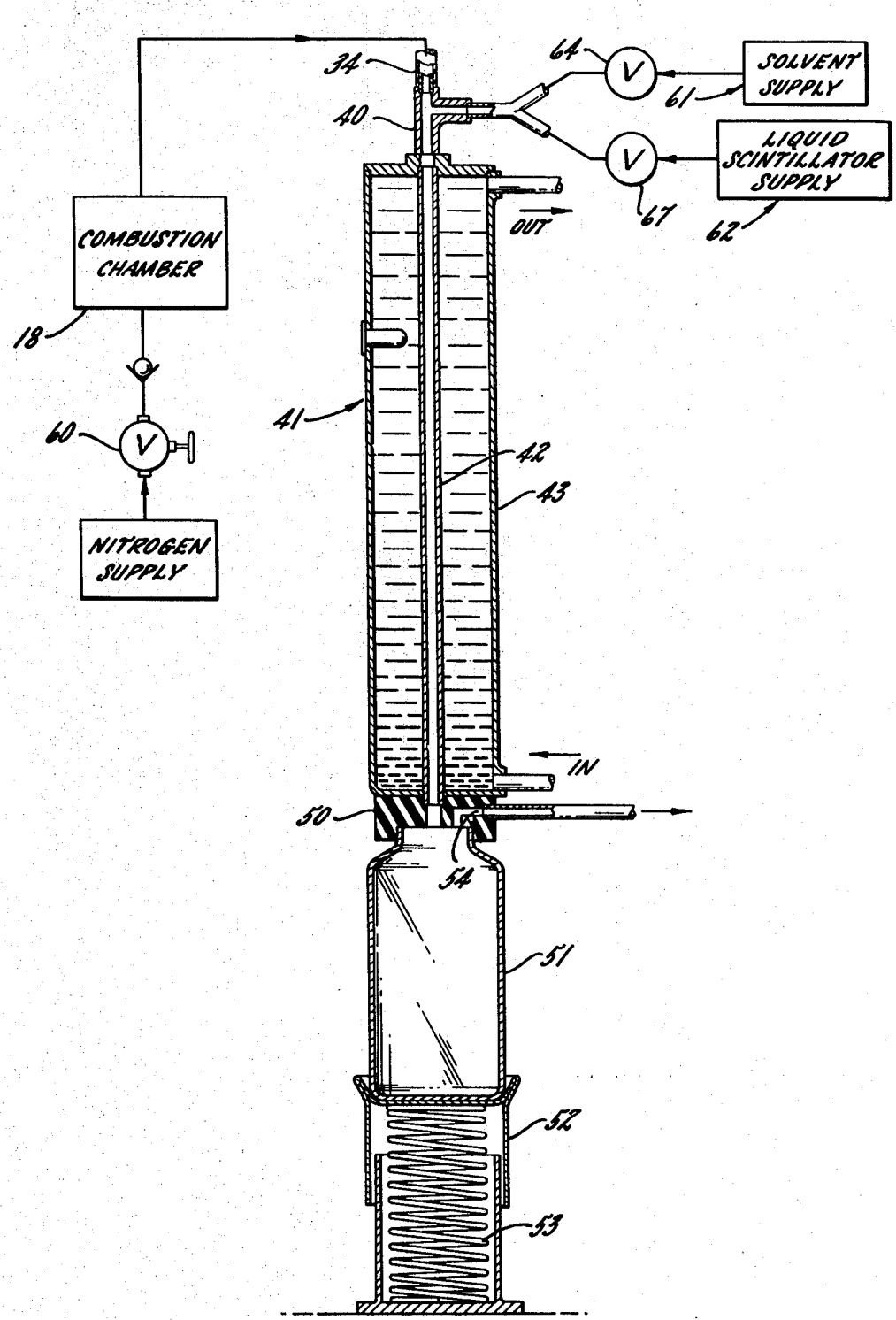
INVENTOR.
NIILO H. KAARTINEN,
BY
Wolfe, Hubbard, Voit & Osann
ATTORNEYS.

HEAT EXCHANGING METHOD FOR FLUID MATERIAL CONTAINING CONDENSIBLE VAPOR

The present invention relates generally to the processing of fluid materials. In its principal application, the invention relates to methods and apparatus for the preparation of samples for radioactive isotope tracer studies and, more particularly, to an improved method and apparatus for preparing such samples by combustion of the starting material containing the isotope tracer.

It is a primary object of the present invention to provide an improved heat exchanger for condensable vapors which provides an extremely high heat transfer with only a small volume and surface area and in a very short time period. In this connection, it is also an object of this aspect of the invention to provide such an improved heat exchanger which is capable of receiving the products of combustion of a radioactive sample and continuously condensing the vapors therefrom in a rapid and efficient manner.

Another important object of the present invention is to provide such an approved heat exchanger which, when used for the preparation of samples for radioactive isotope tracer studies, reduces the sample preparation time far below the preparation times required by methods and apparatus previously known for the preparation of such samples, with corresponding increases in sample preparation rate.

A further object of this invention is to provide such an improved heat exchanger which significantly increases the efficiency of the isotope recovery from the starting material when used in a sample preparation system of the type described above. In this connection, a related object of the invention is to provide such an improved heat exchanger which has virtually no "memory" so that the amount of isotope tracer in any given sample passed there through is substantially independent of any previous preparations carried out in the same apparatus, thereby greatly improving the reliability of the resultant samples and the data derived therefrom.

Other objects and advantages of the invention will become apparent from the following detailed description and upon reference to the accompanying drawing, in which the single drawing is a sectional elevation view of a heat exchanger and condensate separation means for use in the preparation of samples for radioactive isotope tracer studies, and including a schematic diagram of a portion of the fluid system associated therewith.

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention as defined by the appended claims.

Turning now to the drawing, there is illustrated a portion of a sample preparation system for use in the preparation of samples for radioactive isotope tracer studies, such as studies involving tissue distribution and residue levels of drugs in plants and animals. In the preparation of such samples, a sample of the starting material containing the radioactive isotope tracer, such as a sample of the plant or animal tissue, is burned to convert the carbon in the starting material to carbon dioxide and the hydrogen to water, and the radioactive isotope tracer is then recovered from the resulting combustion products. For example, if the particular radioactive isotope tracer employed is $^{14}C$, it appears in the combustion products as $^{14}CO_2$ gas; if the tracer is tritium ($^3H$), it appears in the combustion products as $^3H_2O$ in the form of a condensable vapor. Although $^{14}C$ and $^3H$ are the most commonly employed tracers, it will be understood that a number of other radioactive isotopes may be employed, such as $^{35}S$ which is converted to sulfate during combustion.

In order to provide samples which can be analyzed for radioactivity, the compounds containing the isotope tracers are recovered from the combustion products, and separated from any materials therein which might interfere with the radioactivity determination. For example, the $3H_2O$ is recovered by cooling the combustion products to condense the vapors therein, including the $^3H_2O$ after which the condensed vapors are separated from the remaining gases. The $^{14}CO_2$ may also be recovered by condensation or freezing at extremely low temperatures, such as by the use of liquid nitrogen for example, but it is more conventional to react the $^{14}CO_2$ with a liquid trapping agent such as ethanolamine; the resulting reaction product is then recovered and mixed with a liquid scintillator to provide a sample suitable for use in making a radioactivity determination.

Referring now more specifically to the drawing, the sample of material to be burned is initially placed in a combustion chamber 18 and ignited to produce gaseous combustion products which are discharged from the combustion chamber 18 into a transfer tube 34. A source of oxygen (not shown) is normally associated with the combustion chamber 18 so as to supply oxygen thereto at a rate slightly in excess of that required to support combustion of the starting material. Consequently, there is generally a relatively thin layer of oxygen-rich atmosphere around the flame within the combustion chamber, and this excess oxygen rises through the combustion chamber and is exhausted therefrom along with the combustion products into the transfer tube 34. The transfer tube 34 which is insulated to maintain the fluids passing therethrough in a gaseous state. In the particular embodiment illustrated, the transfer tube 34 is double walled with a metallic inner shell and an insulating outer shell to minimize the heat loss therethrough.

From the transfer tube 34, the gaseous combustion products are passed through a T connection 40 into a heat exchanger 41 for cooling the exhausted combustion products to condense the vapors therein. The heat exchanger 41 includes an inner member 42 forming a fluid passageway for receiving the combustion products from the tube 34, and an outer shell 43 defining an annular cavity around the inner member 42 for receiving a cooling liquid to maintain the walls of the inner passageway at a temperature at least as low as the condensation temperature of the vapors passing therethrough. When the radioactive isotope tracer is in the form of a condensable vapor, such as $^3H_2O$ for example, the heat exchanger 41 functions to convert the tracer from a vapor to liquid form. In cases where the radioactive isotope tracer is in the form of a gas to be reacted with a trapping agent, for example, the heat exchanger 41 functions to remove the condensable vapors from the tracer gas before it is reacted with the trapping agent.

In accordance with the present invention, the fluid passageway of the heat exchanger is formed of thermally conductive material designed to provide laminar flow of gases and vapors passing therethrough in the absence of condensation, and the cross section of th fluid passageway is sufficiently small, preferably less than 0.1 inch, in at least one direction transverse to the fluid flow to provide capillary attraction on the type of liquid condensed within the passageway. Thus, in one preferred embodiment of the invention, the inner member 42 comprises a straight thin walled metal tube having an inside diameter of about 0.05 inch, with a wall thickness of about 0.004 inch, and a length of about 5 inches. Although both the volume and the heat transfer surface area of such a tube are obviously very small, it has been found that such a heat exchanger is capable of reducing the temperature of the combustion gases to the condensation temperature with such a high degree of efficiency that virtually 100 percent of the condensable vapors can be recovered in liquid form at the outlet end of the heat exchanger. Moreover, this heat transfer is effected without producing a high back pressure or otherwise inhibiting the exhaustion of the combustion products from the combustion chamber directly upstream of the heat exchanger inlet.

Although it is not intended to limit this aspect of the invention to any particular theory, it is believed that the fluid passageway designed in accordance with this invention causes droplets of liquid condensate to form along the walls of the passageway, thereby providing extremely efficient heat transfer conditions. This drop-wise condensation may be caused or promoted by the capillary nature of the fluid passageway. When the fluid passageway in the heat exchanger is in tubular form as in the illustrative embodiment, a pulsating pressure is detected at the inlet of the passageway, and it is believed that drop-wise condensation may account for this pulsating pressure. It will be appreciated, however, that the fluid passageway may have forms other than tubular, such as a narrow slot, since capillary attraction is present whenever the surface of a liquid where it is in contact with a solid is elevated by the relative attraction of the molecules of the liquid for each other end for those of the solid.

As another feature of the present invention, a separating means is connected to the outlet end of the heat exchanger for receiving the combustion products, including the condensed vapors, from the heat exchanger and separating the condensed vapors from the remaining gas products, and control means are associated with the combustion chamber for terminating the oxygen supply and supplying an inert gas to the combustion chamber upon completion of the burning of each sample so as to sweep any residual combustion products out of the chamber and on through the heat exchanger into the separating means. Thus, in the illustrative system, a resilient connecter 50 is provided at the lower end of the heat exchanger 41 for connecting the outlet of the fluid passageway member 42 to a conventional sample or counting vial 51. The vial 51 is supported on a platform 52 which is biased upwardly against the connecter 50 by means of a biasing spring 53 to provide a gastight seal around the upper periphery of the vial. As the combustion products are discharged from the lower end of the heat exchanger 41, they flow downwardly into the sample vial 51 so that the liquids are retained in the vial by gravity, while the gases continue on through a discharge passageway 54 formed in the resilient connecter 50.

When the combustion of a given sample has been completed, the oxygen supply to the combustion chamber is terminated, and a valve 60 is opened to supply an inert gas such as nitrogen to the combustion chamber 18. This inert gas, which is supplied under a slight pressure, sweeps upwardly through the combustion chamber 18 so as to purge the chamber of any remaining combustion products, and continues on through the transfer tube 34 and the heat exchanger 41. Consequently, it can be seen that the entire system from the combustion chamber 18 to the sample vial 51 is immediately purged of all gaseous combustion products following each sample combustion, and the purging gas also tends to sweep any remaining liquid condensate out of the heat exchanger. Moreover, since the inert purging gas is discharged from the heat exchanger 41 into the headspace of the sample vial 51 which is used as a part of the liquid-gas separating means, it may also be used to purge oxygen from the vial headspace to avoid the quenching effect of such oxygen during analysis of the resultant sample for radioactivity. Thus, when the sample vial 51 is disconnected from the resilient connecter 50 to place a sealing cap on the vial, the throat of the vial may be maintained directly under the nitrogen discharge from the connecter 50 by simply tilting the vial laterally, so that the nitrogen purges the headspace of the vial by displacing any oxygen remaining therein to the atmosphere. As will be apparent to those familiar with this art, this is an important feature because oxygen is a severe quenching agent, e.g., it distorts the radioactivity measurements made by liquid scintillation counting techniques unless certain steps are taken to compensate for the effect of the quenching agent. Although several means of compensating for such quenching effects are known, they complicate the radioactivity measuring procedure.

After the purging of the combustion chamber and the heat exchanger, the inert purging gas is preferably turned off by closing the valve 60, and the inlet of the heat exchanger 41 may be sequentially connected to a pair of liquid supply systems generally indicated at 61 and 62. The first supply system 61 includes a supply vessel 63 containing a liquid solvent of the type conventionally used in the preparation of samples to be subjected to subfreezing temperatures, so as to maintain the sample in a liquid state. It will be understood that this first liquid supply system 61 is not normally used in the preparation of samples to be handled at above-freezing temperature. The second liquid supply system 62 is used to feed a preselected quantity of liquid scintillator into the heat exchanger 41. The liquids in the supply systems 61 and 62 may be maintained under a slight pressure so that when either of the valves 64 or 67 is opened, the corresponding liquid flows into the T connection 40 and then downwardly through the tubular member 42 of the heat exchanger into the vial 51.

In order to insure that all the liquid supplied to the T connection 40 from the liquid supply systems 61, 62 flows downwardly through the heat exchanger 41, a restriction (not shown) may be formed in the transfer line 34 to prevent liquid from backing up into the line 34 from the T connection 40. As the liquids from the systems 61, 62 flow downwardly through the heat exchanger 41, they are discharged through the connecter 50 into the sample vial 51, where they are retained along with the condensed vapors collected previously.

It will be appreciated that the connection of the two liquid supply systems to the heat exchanger inlet not only provides a convenient means of supplying these liquids to the sample vial connected to the outlet of the heat exchanger, but also insures that substantially all the condensed vapors are recovered from the walls of the heat exchanger tube 42. In this connection, one of the important advantages of the illustrative system is that the radioactive tracer never passes through any valves or other devices having movable parts, thereby facilitating recovery of the tracer and elimination of equipment memory. Moreover, due to the small volume of the heat exchanger, any fluid contained therein changes at a relatively high rate when fluid is flowing therethrough. To insure that all the liquids fed into the heat exchanger 41 are discharged therefrom, it is preferred to resume the nitrogen flow through the heat exchanger, via the combustion chamber, for a short interval of about 5 seconds, for example, after the liquid flow from the two systems 61, 62 has been terminated. (This nitrogen flow can also be used to purge the headspace of the vial 51 as it is removed from the connecter 50, prior to placement of the cap thereon, in the manner described previously.) With this system, it has been found that essentially 100 percent of the radioactive isotope tracer present in the starting material can be recovered in the sample vial 51, when the isotope is in the form of a condensable vapor.

In one example of the invention, 10 one-gram samples of tritium-labelled samples were combusted in sequence in the same equipment, with a blank sample, i.e., a sample containing no radioactive tracer, being combusted after each labelled sample. The combustion of each sample was initiated by the electrical igniter, heated to a temperature of about 1,500°C., and the oxygen flow rate was set at about 2 liters per minute. The pressure inside the combustion chamber during combustion was less than 0.1 atmosphere above atmospheric pressure. The walls of the combustion chamber were preheated and thermostatically maintained at approximately 170°C. which was sufficient to prevent any noticeable condensation of the combustion products on the inside walls of the combustion chamber. During combustion, the combustion products were continuously exhausted through the upper end of the combustion chamber into a heat exchanger, comprising a straight tube of stainless steel having an inside diameter of 0.080 inch, a wall thickness of 0.020 inch, and a length of 10.00 inches. The walls of the tube were maintained at a temperature of about 0°C. From the heat exchanger, condensed vapors including condensed $^3H_2O$ dripped into the counting vial connected to the lower end of the heat exchanger, while the remaining gases passed on through the vial and were vented to the atmosphere.

The combustion of each sample was completed in about 45 seconds, after which the oxygen was turned off and the nitrogen supply to the combustion chamber was turned on so that nitrogen was fed into the combustion chamber at a rate of 7 liters per minute for about 5 to 10 seconds. The nitrogen was then shut off and a selected quantity of dioxane (liquid scintillator) was fed from the metering dispenser into the inlet of the heat exchanger. The metering dispenser was present to feed 10 milliliters of the liquid scintillator into the heat exchanger over a period of about 5 seconds, after which the liquid supply line to the inlet of the heat exchanger was closed, and the nitrogen feed to the combustion vessel was resumed for an additional 5 seconds at rate of about 4 liters per minute During this final nitrogen feed, the counting vial was removed from the resilient connecter at the outlet of the heat exchanger and tilted with the open mouth of the vial positioned below the passageway from the heat exchanger outlet so that the nitrogen supplied to the counting vial during this interval purged the vial of oxygen. The vial cap was then quickly threaded onto the vial to seal the sample contained therein in a nitrogen atmosphere, and the sample was analyzed for radioactivity.

The radioactivity level of the tracer in the starting material placed in the combustion chamber was 100,000 disintegrations per minute (dpm). When the sample collected in the counting vial was analyzed for radioactivity, a count of 42,000 counts per minute (cpm) was measured. The counting efficiency of the analytical method was determined to be 42 percent so that the measured count of 42,000 cpm indicated that there was no loss whatever, i.e., there was 100 percent recovery of the radioactive material. To check the accuracy of the radioactivity measurement made for the recovered material, the same amount and type of radioactive isotope tracer that was injected into the original starting material was placed in a second counting vial and analyzed for radioactivity in the same equipment used to analyze the recovered sample. The count measured for this second counting vial was identical to the measurement for the first sample, i.e., the count was 42,000 cpm in each case, thereby confirming that the recovery was in face 100 percent. Over the series of 10 samples, the standard deviation of recovery was determined to be 0.7 percent, which is about the same degree of variability accounted for by statistical variations in the samples plus the accuracy of the analytical instrument without automatic standardization. Based on a comparison of the counts of the radioactive samples and the alternate blank samples, a memory of one ten-thousandths or less was obtained consistently throughout the entire series of samples. The 42 percent counting efficiency compares with maximum efficiencies of 25 percent to 36 percent obtainable by comparable methods used previously, the improvement being due in large measure to the fact that there was little or no oxygen present in the sample so that quenching effects were minimized or perhaps even eliminated. In addition to the increase in efficiency, there was a corresponding reduction in background, so that the resulting figure of merit (efficiency squared divided by background) was significantly increased. For example, with the 42 percent efficiency, the background was 27 so that the figure of merit was 650, which compares with a figure of merit of 370 obtainable by the conventional previous methods. The total time required to prepare the above samples was such that about 30 to 40 samples could be prepared per hour.

I claim:

1. An improved heat exchanging method for cooling hot gases containing condensable vapors, said method comprising passing the hot gases containing the condensable vapors through an elongated fluid passageway designed to provide laminar flow of gases and vapors passing therethrough in the absence of condensation, and maintaining the walls of said fluid passageway at a temperature at least as low as the condensation temperature of the vapors passing therethrough, the cross section of said passageway being sufficiently small in at least one direction transverse to the fluid flow to provide capillary attraction with the type of liquid condensed in said passageway.

2. An improved heat exchanging method as set forth in claim 1 further characterized by the step of passing an inert gas through said fluid passageway following condensation of the vapors from the hot gases so as to sweep any residual fluids on through said passageway.

3. An improved heat exchanging method as set forth in claim 1 further characterized by the step of collecting said condensed vapors in a sample vial and directing said inert gas from said heat exchanger into said vial so as to purge the headspace of said vial.

4. An improved heat exchanging method as set forth in claim 1 further characterized by the step of supplying a liquid to the inlet of said fluid passageway following condensation of said vapors from said hot gases so that said liquid flows through said passageway so as to remove any condensed vapors remaining therein.

5. An improved heat exchanging method as set forth in claim 4 further characterized in that said liquid is a liquid scintillator.

6. An improved heat exchanging method as set forth in claim 4 further characterized in that said liquid is a solvent for the condensed vapors.

7. An improved heat exchanging method as set forth in claim 4 further characterized in that a liquid scintillator and a liquid solvent are supplied sequentially to the inlet of said fluid passageway.

8. An improved heat exchanging method for cooling hot gases containing condensable vapors, said method comprising passing the hot gases containing the condensable vapors through an elongated tubular fluid passageway designed to provide laminar flow of gases and vapors passing therethrough in the absence of condensation, the cross section of said passageway being sufficiently small in at least one direction transverse to the fluid flow to provide a pulsating fluid pressure at the inlet of said passageway in the presence of condensation therein, and maintaining the walls of said fluid passageway at a temperature at least as low as the condensation temperature of the vapors passing therethrough.